(12) United States Patent
Levin et al.

(10) Patent No.: US 12,359,027 B2
(45) Date of Patent: Jul. 15, 2025

(54) AVOBENZONE FUSING AGENTS FOR THREE-DIMENSIONAL PRINTING (71) Applicant: PERIODT PRINT LLC, Palo Alto, CA (US)

(72) Inventors: Emily Levin, San Diego, CA (US); Emre Hiro Discekici, San Diego, CA (US); Stephen G. Rudisill, San Diego, CA (US); Krzysztof Nauka, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 14 days.

(21) Appl. No.: 18/280,437

(22) PCT Filed: Mar. 9, 2021

(86) PCT No.: PCT/US2021/021453
§ 371 (c)(1),
(2) Date: Sep. 5, 2023

(87) PCT Pub. No.: WO2022/191824
PCT Pub. Date: Sep. 15, 2022

(65) Prior Publication Data
US 2024/0141114 A1 May 2, 2024

(51) Int. Cl.
*B29C 64/00* (2017.01)
*B29C 64/124* (2017.01)
*B29C 64/165* (2017.01)
*B29C 64/171* (2017.01)
*B33Y 70/00* (2020.01)
*B33Y 80/00* (2015.01)
*C08J 3/09* (2006.01)
*B29K 471/00* (2006.01)

(52) U.S. Cl.
CPC ............. *C08J 3/095* (2013.01); *B29C 64/124* (2017.08); *B29C 64/165* (2017.08); *B29C 64/171* (2017.08); *B33Y 70/00* (2014.12); *B33Y 80/00* (2014.12); *B29K 2471/12* (2013.01)

(58) Field of Classification Search
CPC ................................. C08J 3/095; B33Y 70/00
See application file for complete search history.

(56) References Cited

U.S. PATENT DOCUMENTS

| 9,643,359 B2 | 5/2017 | Baumann et al. |
| 9,765,226 B2 | 9/2017 | Dain |
| 10,351,523 B2 | 7/2019 | Nacharaju et al. |

(Continued)

FOREIGN PATENT DOCUMENTS

| CN | 112062878 A | 12/2020 |
| WO | 2020/190259 A1 | 9/2020 |

(Continued)

*Primary Examiner* — Nicholas R Krasnow
(74) *Attorney, Agent, or Firm* — Dierker & Kavanaugh, P.C.

(57) ABSTRACT

A three-dimensional printing kit can include a build material with from about 80 wt % to 100 wt % polymeric particles having a D50 particle size from about 10 μm to about 150 μm, and a fusing agent including from about 0.5 wt % to about 20 wt % avobenzone particles dispersed in an aqueous liquid vehicle based on a total weight of the fusing agent.

13 Claims, 4 Drawing Sheets (56) References Cited

U.S. PATENT DOCUMENTS

| | | | |
|---|---|---|---|
| 2016/0056416 A1* | 2/2016 | Flitsch | H01M 4/134 |
| | | | 429/185 |
| 2018/0272607 A1 | 9/2018 | Chaffins et al. | |
| 2018/0355149 A1* | 12/2018 | Sasaki | C09B 67/0034 |
| 2024/0269922 A1* | 8/2024 | Hartman | B29D 11/00923 |

FOREIGN PATENT DOCUMENTS

| | | |
|---|---|---|
| WO | 2020/251528 A1 | 12/2020 |
| WO | 2021/010961 A1 | 1/2021 |
| WO | 2021/025696 A1 | 2/2021 |

\* cited by examiner

FIG. 6

AVOBENZONE FUSING AGENTS FOR THREE-DIMENSIONAL PRINTING

BACKGROUND

Methods of three-dimensional (3D) digital printing, a type of additive manufacturing, have continued to be developed over the last few decades. In general, three-dimensional printing technology can change the product development cycle by allowing rapid creation of prototype models or even finished products. For example, several commercial sectors such as aviation and the medical industry, to name a few, have benefitted from rapid prototyping and/or the production of customized parts. There are various methods for three-dimensional printing that have been developed, including heat-assisted extrusion, selective laser sintering, photolithography, additive manufacturing, as well as others. As technology advances, higher demands with respect to production speed, part consistency, rigidity, method flexibility, etc., are requested by customers.

DETAILED DESCRIPTION

The present disclosure is drawn to three-dimensional (3D) printing kits, systems, and methods for three-dimensional printing. More particularly, the three-dimensional printing kits can be used with multi-jet fusion (MJF) where polymeric particles of a build material can be spread on a powder bed on a layer-by-layer basis. The various layers can be selectively contacted with jetting fluid(s) which can include a radiation absorber. The jetting fluid(s) can be ejected from a print head, such as a fluid ejector similar to an inkjet print head, for example, and then the layer can be exposed to electromagnetic radiation to heat the layer of the build material. The radiation absorber can absorb the electromagnetic radiation and emit heat to the surrounding polymeric particles thereby fusing the adjacent polymeric particles to one another. This can be repeated layer-by-layer until a three-dimensional object is formed.

In accordance with this, the present disclosure is drawn to a fusing agent for three-dimensional printing that can include an aqueous liquid vehicle including water, organic cosolvent, and dispersant, from about 0.5 wt % to about 20 wt % avobenzone particles in the aqueous liquid vehicle based on a total weight of the fusing agent. The avobenzone particles can have a D50 particle size from about 30 nm to about 1000 nm. In further detail, the fusing agent can have a peak absorption from about 345 nm to about 415 nm, and in one example, the fusing agent can have an absorbance from about 0.2 to about 0.8 at the peak absorption. In one specific example, the fusing agent can include from about 10 wt % to about 85 wt % water, from about 5 wt % to about 60 wt % organic cosolvent, from about 0.01 wt % to about 5 wt % surfactant, and from about 0.05 wt % to about 20 wt % dispersant.

In another example, a three-dimensional printing kit that can include a build material including from about 80 wt % to 100 wt % polymeric particles having a D50 particle size from about 10 μm to about 150 μm, and a fusing agent including from about 0.5 wt % to about 20 wt % avobenzone particles dispersed in an aqueous liquid vehicle based on a total weight of the fusing agent. In one example, the avobenzone particles can have a D50 particle size from about 30 nm to about 1000 nm. In another example, the fusing agent can have a peak absorption from about 350 nm to about 415 nm. The fusing agent can have an absorbance from about 0.2 to about 0.8 at the peak absorption. In another example, the fusing agent can include from about 10 wt % to about 85 wt % water, from about 5 wt % to about 60 wt % organic cosolvent, from about 0.01 wt % to about 5 wt % surfactant, and from about 0.05 wt % to about 20 wt % dispersant. In one example, the polymeric particles can be white. In further detail, after application of the fusing agent to a layer of polymeric particles followed by heat fusion using light energy applied at a peak wavelength from about 350 nm to about 415 nm, an energy level from about 2 W'/cm 2 to about 30 W/cm², and an irradiation application time from of about 0.1 second to about 10 seconds to form a fused polymeric layer, the fused polymeric layer remains white. In another example, the polymeric particles can include polyacetals, polyacrylates, polybutylene terephthalates, polycarbonates, polyesters, polyether ketones, polyethylene terephthalates, polyethylenes, polypropylenes, polystyrenes, polyurethanes, thermoplastic polyurethanes, polyamides, thermoplastic polyamides, a copolymer thereof, or a mixture thereof. In another more detailed example, the three-dimensional printing kit can also include a second fluid agent, such as a coloring agent including a liquid vehicle and a colorant or a detailing agent including a detailing compound. The detailing compound can reduce a temperature of the build material onto which the detailing agent is applied In another example, a method for three-dimensional printing can include iteratively applying individual build material layers of a polymer build material including from about 80 wt % to 100 wt % polymeric particles having a D50 particle size from about 10 μm to about 150 μm to a powder bed, and based on a three-dimensional object model, iteratively and selectively dispensing a fusing agent onto the individual build material layers, wherein the fusing agent includes from about 0.5 wt % to about 20 wt % avobenzone particles dispersed in an aqueous liquid vehicle based on a total weight of the fusing agent. The method can also include iteratively exposing the powder bed to light energy having a peak wavelength from about 345 nm to about 415 nm for a time duration of about 0.1 second to about 10 seconds to selectively fuse the polymeric particles in contact with the avobenzone particles at the individual build material layers resulting in a fused three-dimensional object. The method can also include milling avobenzone in an aqueous carrier resulting in avobenzone particles having a D50 particle size from about 30 nm to about 1000 nm to form the fusing agent, or milling avobenzone in an aqueous carrier resulting in avobenzone particles having a D50 particle size from about 30 nm to about 1000 nm followed by admixing additional aqueous liquid vehicle with the aqueous carrier and avobenzone particles to form the fusing agent. The fused three-dimensional object formed can be white, for example. In still further detail, based on the three-dimensional object model, the method can further include iteratively applying a second fluid agent to individual build material layers, wherein the second fluid agent is selected from a coloring agent that includes a liquid vehicle and a colorant, or a detailing agent that includes a detailing compound that reduces a temperature of the build material onto which the detailing agent is applied.

In another example, a three-dimensional printed object can include multiple fused polymeric layers that are also fused to one another with individual fused polymeric layers including a fused composite of polymeric particles and avobenzone particles at a weight ratio from about 1000:1 to about 9:1. In one example, the multiple fused polymeric layers can be white.

It is noted that when discussing the three-dimensional printing kits, the methods for three-dimensional printing, and the three-dimensional printed objects, these discussions can be considered applicable to other examples, whether or not they are explicitly discussed in the context of that example. Thus, for example, in discussing a build material related to the three-dimensional printing kits, such disclosure is also relevant to and directly supported in context of the methods for three-dimensional printing and/or the three-dimensional printed objects, and vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Fusing Agents

Figure 1:
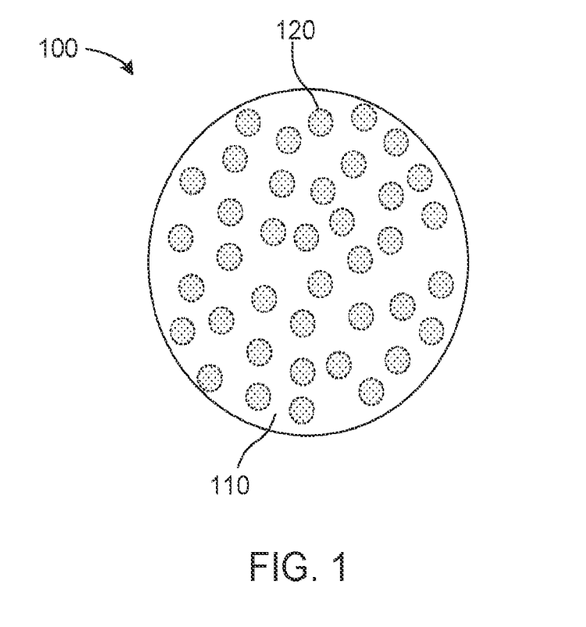
FIG. 1 schematically illustrates an example three-dimensional printing kit in accordance with the present disclosure.

As shown in FIG. 1, a fusing agent 100 for three-dimensional printing that can include an aqueous liquid vehicle 110 with water, organic cosolvent, and dispersant, for example, and can also include from about 0.5 wt % to about 20 wt % avobenzone particles 120 in the aqueous liquid vehicle based on a total weight of the fusing agent. The avobenzone particles can have a D50 particle size from about 30 nm to about 1000 nm. In further detail, the fusing agent can have a peak absorption from about 345 nm to about 415 nm, and in one example, the fusing agent can have an absorbance from about 0.2 to about 0.8 at the peak absorption. In one specific example, the fusing agent can include from about 10 wt % to about 85 wt % water, from about 5 wt % to about 60 wt % organic cosolvent, from about 0.01 wt % to about 5 wt % surfactant, and from about 0.05 wt % to about 20 wt % dispersant. Additional detail regarding the fusing agent is included elsewhere herein in the context of the three-dimensional printing kits, methods, systems, objects, and the like. The avobenzone particles can provide radiation absorbing capability to receive electromagnetic radiation with a peak emission within the range of about 345 nm to about 415 nm, from about 355 nm to about 405 nm, or from about 365 nm to about 395 nm.

Three-Dimensional Printing Kits

Figure 2:
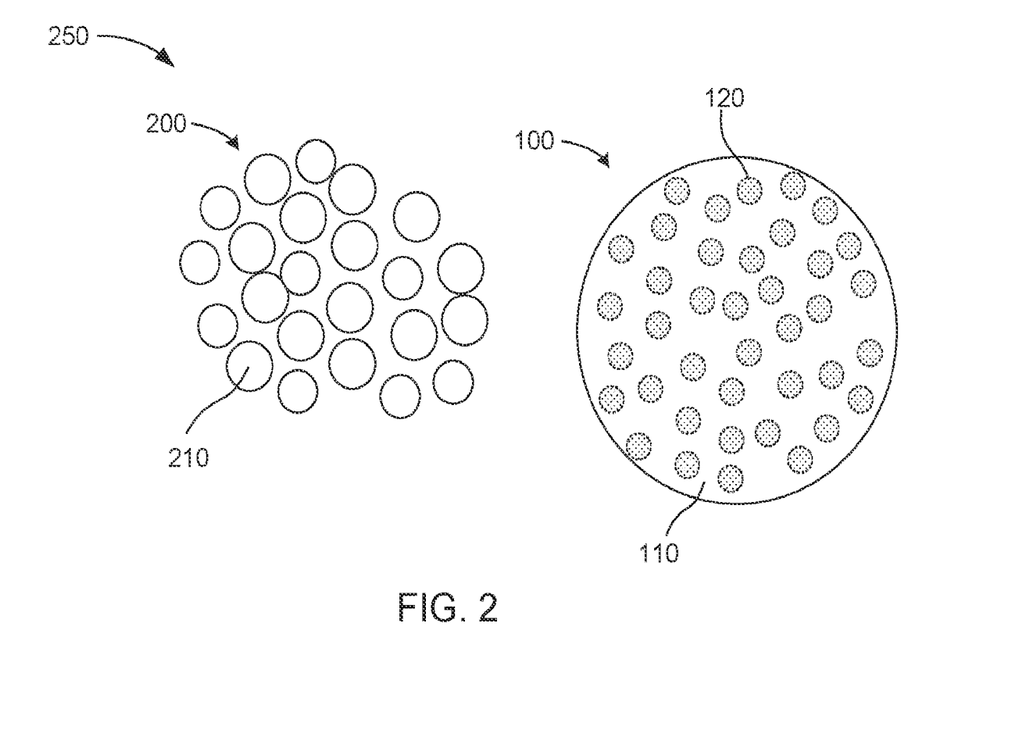
FIG. 2 schematically illustrates an example three-dimensional printing kit in accordance with the present disclosure.

Turning now to more detail regarding the three-dimensional printing kits, as shown in FIG. 2, an example three-dimensional printing kit 250 can include a build material 200 including from about 80 wt % to about 100 wt % polymeric particles 210 having a D50 particle size from about 10 μm to about 150 μm. The three-dimensional printing kit can further include a fusing agent 100 including an aqueous liquid vehicle 110 and avobenzone particles 120 dispersed therein. The avobenzone particles can provide radiation absorbing capability to receive electromagnetic radiation with a peak emission within the range of about 345 nm to about 415 nm, from about 355 nm to about 405 nm, or from about 365 nm to about 395 nm, which causes the avobenzone particles to become heated, providing a sufficient temperature boost to cause the polymeric particles to become heat melted or fused. For example, by application of electromagnetic energy within one of these ranges at an energy level from about 2 W/cm$^2$ to about 30 W/cm$^2$ with and an irradiation application time (or dwell time) from of about 0.1 second to about 10 seconds, the polymeric particles of the build material can be sufficiently heated to cause intra-layer heat fusion as well as inter-layer fusion (from layer to layer), such as by the melting together of particles and layers In further detail regarding the build material 200, the polymeric particles 210 can be present at from about 80 wt % to 100 wt % from about 90 wt % to 100 wt %, from about 95 wt % to about 100 wt %, from about 80 wt % to about 90 wt %, from about 85 wt % to about 95 wt %, or at about 100 wt %. Other particles other than the polymeric particles, if present, can be included such as filler, charging particles, flow aid particles, etc., as described in detail hereinafter.

The polymeric particles 210 can be selected from polyacetal, polyacrylate, polyamide, polybutylene terephthalate, polycarbonate, polyester, polyether ketone, polyethylene terephthalate, polyethylene, polypropylene, polystyrene, polyurethane, thermoplastic polyamides, thermoplastic polyurethane, copolymers thereof, blends of any of the multiple polymers listed herein, as well as mixtures thereof. In one example, the polymeric particles can include a polyamide, and the polyamide can be selected from polyamide-6, polyamide-9, polyamide-11, polyamide-12, polyamide-66, polyamide-612, or a combination thereof. In yet other examples, the polymeric particles can include a polyacrylate, polybutylene terephthalate, polycarbonate, polyester, polyethylene, polystyrene, polyurethane, copolymers thereof, blends of any of the multiple polymers listed herein, as well as mixtures thereof. Core shell polymer particles of these materials may also be used. In some examples, the build material can exclude amorphous materials.

The polymeric particles (and other particles if present) of the build material can have a D50 particle size that can range from about 10 μm to about 150 μm. Polymeric particles can have a D50 particle size that can range from about 10 μm to about 150 μm, from about 10 μm to about 100 μm, from about 20 μm to about 80 μm, from about 30 μm to about 50 μm, from about 25 μm to about 75 μm, from about 40 μm to about 80 μm, from about 50 μm to about 75 μm, from about 75 μm to about 150 μm, from about 60 μm to about 90 μm, or from about 100 μm to about 150 μm, for example. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. Particle size can be reported as a volume equivalent sphere diameter. In some examples, an average particle size can refer to a mathematical average of the particle sizes, which is normally about the D50 particle size, but can be different depending on the particle size distribution.

That being stated, an example Gaussian-like distribution of the particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of about 25 μm means that about 50% of the particles (by number) have a particle size greater than about 25 μm and about 50% of the particles have a particle size less than about 25 μm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same.

A shape of the particles of the build material can be spherical, irregular spherical, rounded, semi-rounded, discoidal, angular, subangular, cubic, cylindrical, or any combination thereof. In one example, the particles can include spherical particles, irregular spherical particles, or rounded particles. In some examples, the shape of the particles can be uniform or substantially uniform, which can allow for relatively uniform melting of the particles.

The polymeric particles in the build material can have a melting point that can range from about 75° C. to about 350° C., from about 100° C. to about 300° C., or from about 150° C. to about 250 CC. As examples, the build material can be a polyamide having a melting point of about 170° C. to about 190° C., or a thermoplastic polyurethane that can have a melting point ranging from about 100° C. to about 165° C. A variety of thermoplastic polymers with melting points or softening points in these ranges can be used. In a specific example, the build material can include polyamide particles, such as polyamide-12, which can have a melting point from about 175° C. to about 200 CC. In another example, elastomers such as thermoplastic polyamides can be used, which may have a melting point from about 135 CC to about 210 CC in some examples.

The build material may include, in addition to the polymeric particles, other particles such as filler particles, charging particles, flow aid particles, or a combination thereof. Charging particles, for example, may be added to suppress tribo-charging. Examples of suitable charging particles include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging particles include HOSTASTAT® FA 38 (natural based ethoxylated alkylamine), HOSTASTAT® FE2 (fatty acid ester), and HOSTASTAT® HS 1 (alkane sulfonate), both from Clariant Int, Ltd. (North America). In an example, if added, the charging particles can be included in an amount ranging from greater than 0 wt % to about 20 wt %, from about 0.1 wt % to about 10 wt %, or from about 0.2 to about 5 wt %, based upon the total wt % of the build material.

Flow aid particles may be added to increase the coating flowability of the build material. Flow aid particles may be particularly desirable when the particles of the build material are on the smaller end of the particle size range. The flow aid particles can increase the flowability of the build material by reducing friction, lateral drag, and tribocharge buildup (by increasing the particle conductivity). Examples of suitable flow aid particles include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E558), bentonite (E558), aluminum silicate (E559), stearic acid (E570), or polydimethylsiloxane (E900). In an example, if added, the flow aid particles can be included in an amount ranging from greater than 0 wt % to about 20 wt %, from about 0.1 wt % to about 10 wt %, or from about 0.2 to about 5 wt %, based upon the total wt % of the build material, In further detail regarding the fusing agent 100 that may be present in the three-dimensional printing kit 100, the three-dimensional printing system (shown by example at FIG. 4), or utilized in a method of three-dimensional printing (shown by example at FIG. 3) as described herein, during three-dimensional printing, the fusing agent can be applied to the build material on a layer-by-layer basis and can move into vacant spaces between particles of the build material. The fusing agent can provide binding between polymeric particles after printing of the fusing agent and exposure to electromagnetic energy within the absorption spectrum of the avobenzone particles 120. The fusing agent can include an aqueous liquid 110 vehicle and the avobenzone particles dispersed therein as a fusing compound. The fusing compound, e.g., avobenzone particles, may be present in the fusing agent at a concentration from about 0.5 wt % to about 20 wt %, from about 0.5 wt % to about 10 wt %, from about 0.5 wt % to about 8 wt %, from about 0.5 wt % to about 5 wt %, from about 1 wt % to about 10 wt %, or from about 2 wt % to about 20 wt %, for example.

The avobenzone particles can provide a boosting capacity sufficient to increase the temperature of the build material above the melting or softening point of the polymeric particles therein. As used herein, "temperature boosting capacity" refers to the ability of avobenzone particles as a fusing compound to convert ultraviolet (from about 345 nm to about 415 nm) into thermal energy to increase the temperature of the polymeric particles of the build material over and above the temperature of the unprinted portion of the build material. Typically, the build material can be fused together when the temperature increases to or above the melting or softening temperature of a polymer of the polymeric particles, but fusion can also occur in some instance below the melting point. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the polymeric particles in contact with the avobenzone particles can coalesce to form a layer of a three-dimensional part while the remaining polymeric particles can remain loose.

As used herein, "peak absorption" indicates that from about 20% to about 100% of light emitted at a specified wavelength range is absorbed by the avobenzone particles. In other examples, at least about 50%, at least about 70%, at least about 80%, at least about 90%, at least about 95%, or 100% of the light emitted at the wavelengths emitted by an energy source can be absorbed by the avobenzone particles. The avobenzone particles can exhibit absorption at other wavelengths outside of this range, but the avobenzone particles will exhibit at least one absorption peak of from about 50% to 100% absorption within the range of about 350 nm to about 415 nm, and the absorption is sufficient to cause the polymeric particles of the build material to become intra-layer and inter-layer heat-fused to form a multi-layered three-dimensional object. In further detail, when fusing the build material, a certain minimum amount of radiation ($J/cm^2/sec$) can be used to cause fusing. Whether that amount comes from 20% or 80% or 100% of the incoming radiation that is absorbed (e.g., such as from inherent material absorption subtracting reflection, etc.), as long as there is enough radiation used, fusing can occur. The term "fuse" or "fusing" when referring to the build material indicates that polymeric particles are fully or partially melted together so that that they become joined, and thus upon cooling, the three-dimensional printed objects formed are in the form of a monolithic mass polymer (whether the particles were fully melted or partially melted and joined at their surfaces). Furthermore, as avobenzone particles are used as the fusing compound in the fusing agent, the avobenzone particles are dispersed within the monolithic mass of the three-dimensional printed object in accordance with examples of the present disclosure. The term "fusing agent" should not be confused with a description of "fusing" of the polymeric particles. For example, the fusing agent containing avobenzone particles is used to absorb electromagnetic energy and convert that energy to heat so that at locations where it is applied to layers of the build material, the polymer particles can become fused, e.g., melted, together.

As used herein, "absorbance" indicates the capacity of the avobenzone particles to absorb light, and can be measured using a UV-visible spectrophotometer such as Cary 5000 spectrometer, for example. In some examples, the avobenzone particles can have an absorbance greater than about 0.2, e.g., from about 0.2 to about 2.0, from about 0.2 to about 1, or from about 0.3 to about 0.8. This range can depend on the avobenzone particles (or absorber) concentration in the fusing agent. To illustrate, at a concentration of 0.5 wt % to 20 wt % avobenzone particles in the fusing agent, a 0.2 and 0.8 absorbance represents an absorbance range that can be reasonably achieved based on about 60% reflected energy to 12% reflected energy, resulting in enough heat to heat-fuse polymeric particles of the build material.

In some examples, the avobenzone particles can be in the form of dispersed particles. The dispersed particles can be formed having a D50 particle size from about 30 nm to about 1000 nm by milling avobenzone in an aqueous dispersion vehicle, e.g., water, organic cosolvent such as propylene glycol, dispersant, etc. Other methods of forming avobenzone particles within the size range can also be carried out. In other examples, the D50 particle size can be from about 50 nm to about 1000 nm, from about 50 nm to about 250 nm, from about 50 nm to about 150 nm, from about 50 nm to about 100 nm, from about 100 nm to about 1000 nm, or from about 100 nm to about 500 nm. When the avobenzone particles are formed, they can formulate in a fusing agent.

One practical approach is to form the fusing agent by adding additional carrier components to the avobenzone particles and the aqueous dispersion vehicle. Thus, combining the additional carrier components with the aqueous dispersion vehicle can form an aqueous liquid vehicle for the fusing agent. The aqueous liquid vehicle, once farmed, can include water as a major solvent, e.g., the solvent present at the highest concentration when compared to other cosolvents. The aqueous liquid vehicle can be present in the fusing agent at from about 50 wt % to about 99.9 wt %. Water may be included in the fusing agent at from about 10 wt % to about 99.9 wt %, from about 10 wt % to about 80 wt %, from about 50 wt % to about 99.9 wt %, from about 60 wt % to about 98 wt %, from about 60 wt % to about 95 wt %, or from about 50 wt % to about 85 wt %, based on a total weight of the fusing agent.

Apart from water, the aqueous liquid vehicle may further include organic cosolvent, e.g., the organic cosolvent if used in the aqueous dispersing vehicle and any other organic cosolvents added. The organic cosolvent can be present in the aqueous liquid vehicle at from about 1 wt % to about 50 wt %, from about 5 wt % to about 35 wt %, from about 10 to about 35 wt %, or from about 5 wt % to about 15 wt %, for example. In one example, the organic cosolvent can have a boiling point that can range from about 150° C. to about 300° C., In yet other examples, a boiling point of the organic cosolvent can range from about 160° C. to about 300° C., from about 180° C. to about 300 CC, or from about 200° C. to about 280° C. In some examples; the organic cosolvent may act as a humectant preventing printheads from drying. The organic cosolvent may also act as a coalescing solvent which in conjunction with the avobenzone particles can provide binding to the particulate build material.

In some examples, the organic cosolvent can be selected from a polyol, an oligoglycol, or a lectern. In another example, the organic cosolvent can be a polyol. In one example, the organic cosolvent can be selected from diols; 1,2 butanediol; 1,2-propanediol; 2,3-butanediol; 1,2-pentanediol; 2-methyl-2,4-pentanediol; 2-methyl-1,3-propanediol; triols; tetrahydrofuran; ethylene glycol dimethyl ether; ethylene glycol diethylene glycol; triethylene glycol; propylene glycol; tripropylene glycol butyl ether; lecterns; 2-pyrrolidone; 1-(2-hydroxyl)-2-pyrrolidone; or a combination thereof. In another example, the organic cosolvent can be a diol and the dial can be selected from 1,2 butanediol; 1,2-propanediol; 2,3-butanediol; 1,2-pentanediol; 2-methyl-2,4-pentanedial; 2-methyl-1,3-propanediol; or a combination thereof. In yet another example, the organic cosolvent can be 1,2-butanediol. In another example, the organic cosolvent can be propylene glycol.

In other examples, the aqueous liquid vehicle can further include from about 0.1 wt % to about 10 wt % of other liquid components based on a total weight of the fusing agent. The other liquid components can include surfactant, dispersant, additive that inhibits growth of harmful microorganisms, pH adjuster, buffer, viscosity modifier, sequestering compound, preservative, etc.

In one example, the aqueous liquid vehicle may include surfactant. The surfactant can include a non-ionic surfactant, a cationic surfactant, and/or an anionic surfactant. Example non-ionic surfactants can include self-emulsifiable, nonionic wetting agents based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA), or an ethoxylated wetting agent and molecular defoarner (e.g., SURFYNOL® 420 from Air Products and Chemical Inc.; USA). Still other examples of surfactants can include wetting agents and molecular defoamers (e.g., SUR- FYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TION-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOO 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), oleth-3 phosphate surfactant (e.g., CRODAFOS™ N3 Acid from Croda, UK), and dioctyl sulfosuccinate sodium salt. Example cationic surfactant can include dodecyltrimethylammonium chloride, hexadecyldimethylammonium chloride, or a combination thereof. In some examples, the surfactant can include a co-polymerizable surfactant. Co-polymerizable surfactants can include polyoxyethylene alkylphenyl ether ammonium sulfate, sodium polyoxyethylene alkylether sulfuric ester, polyoxyethylene styrenated phenyl ether ammonium sulfate, or mixtures thereof. In some examples, the surfactant (which may be a blend of multiple surfactants) may be present in the fusing agent at an amount ranging from 0.01 wt % to 5 wt %, from 0.05 wt % to 2 wt %, or from 0.01 wt % to 1 wt %.

Some example additives that can inhibit the growth of harmful microorganisms can include biocides, fungicides, and other microbial agents. Example antimicrobial agents can include the NUOSEPT® (Ashland Inc., USA), VANCIDE® (R.T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65E, and CARBOQUAT® 250-T, (Lonza Ltd. Corp., Switzerland), KORDEKO MLX (The Dow Chemical Co., USA), and a combination thereof. In an example, if included, a total amount of antimicrobial agents in the fusing agent can range from 0.01 wt % to 3 wt %.

In some examples, an aqueous liquid vehicle may further include a pH adjuster or buffer. The pH adjuster can be any compound that raises or lowers the pH when added in relative small amounts, e.g., 0.01 wt % to about 1 wt %. The buffer, if used, can be provided to withstand small changes (e.g., less than 1) in pH when small quantities of a water-soluble acid or a water-soluble base are added to a composition containing the buffer. The buffer can have a pH that can range from 5 to 9.5, from 7 to 9, or from 7.5 to 8.5. In some examples, the buffer can include a poly-hydroxy functional amine. In other examples, the buffer can include potassium hydroxide, 2-[4-(2-hydroxyethyl) piperazin-1-yl] ethane sulfonic acid, 2-amino-2-(hydroxymethyi)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediarnine, beta-alanine, betaine, or mixtures thereof. In yet other examples, the buffer can include 2-amino-2-(hydroxymethyl)-1,3-propanediol (TRIZMA® sold by Sigma-Aldrich, USA), beta-alanine, betaine, or mixtures thereof.

When applied to a layer of the build material, the aqueous liquid vehicle can be capable of wetting the build material and the avobenzone particles can be capable of penetrating into microscopic pores of the layer (e.g. the spaces between the polymeric particles of the build material). The avobenzone particles can be activated by heating using exposure to electromagnetic radiation, including UV electromagnetic radiation. When activated, the fusing agent can form continuous network of polymer, melting the polymeric particles of the build material together to form a three-dimensional object or a printed layer of the three-dimensional object.

In some specific examples, the three-dimensional printing kit can include additional fluids or agents, such as coloring agents to impart color, detailing agents to provide more detailed printing at the border of the three-dimensional printed object, or the like. A coloring agent, if present, can include an aqueous liquid vehicle similar to that used in the fusing agent and a colorant, such as a pigment and/or a dye. As the printed three-dimensional parts of the present disclosure can be white after fusion, a coloring agent can be used with good success in providing color, even multi-colored portions, to the three-dimensional object.

The detailing agent, on the other hand, can include a detailing compound. The detailing compound can reduce a temperature of the build material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

The detailing compound can be water and/or an organic cosolvent that can evaporate at the temperature of the powder bed. In some cases the powder bed can be preheated to a preheat temperature within about 10° C. to about 70° C. of the fusing temperature of the polymeric particles. Depending on the type of polymeric particles used, the preheat temperature can be in the range of about 90° C. to about 200° C. or higher. The detailing compound can be a solvent that can evaporate when it comes into contact with the powder bed at the preheat temperature, thereby cooling the printed portion of the powder bed through evaporative cooling.

In certain examples, the detailing agent can include water, cosolvents, or a combination thereof. In some examples, the detailing agent can be mostly water. For example, the detailing agent can be from about 85 wt % to 100 wt %, or from about 85 wt % to about 99 wt % water. In further examples, the detailing agent can be from about 95 wt % to 100 wt %, or from about 95 wt % to 99 wt % water.

In some example, the detailing agent can include a cosolvent. The cosolvent can be as identified above. In another example, cosolvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol; N,N-dimethyl acetamide, and a combination thereof. The cosolvent may be present in the detailing agent at from about 1 wt % to about 15 wt %, at from about 5 wt % to about 10 wt %, at from about 1 to about 10 wt %, or from about 5 wt % to about 15 wt %.

In still further examples, the detailing agent can be substantially devoid of avobenzone particles or other radiation absorbers. That is, in some examples, the detailing agent can be substantially devoid of ingredients that absorb enough radiation energy to cause particles of the build material to fuse or adhere to one another. In some examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead, e.g., piezo- or thermal-printhead. In some examples, the detailing agent can include jettability imparting ingredients such as those in the fusing agent described above. These ingredients can include a liquid vehicle, surfactant, dispersant, cosolvent, biocides, viscosity modifiers, materials for pH adjustment, sequestering agents, preservatives, and so on. These ingredients can be included in any of the amounts described above.

Three-Dimensional Printing Methods

Figure 3:
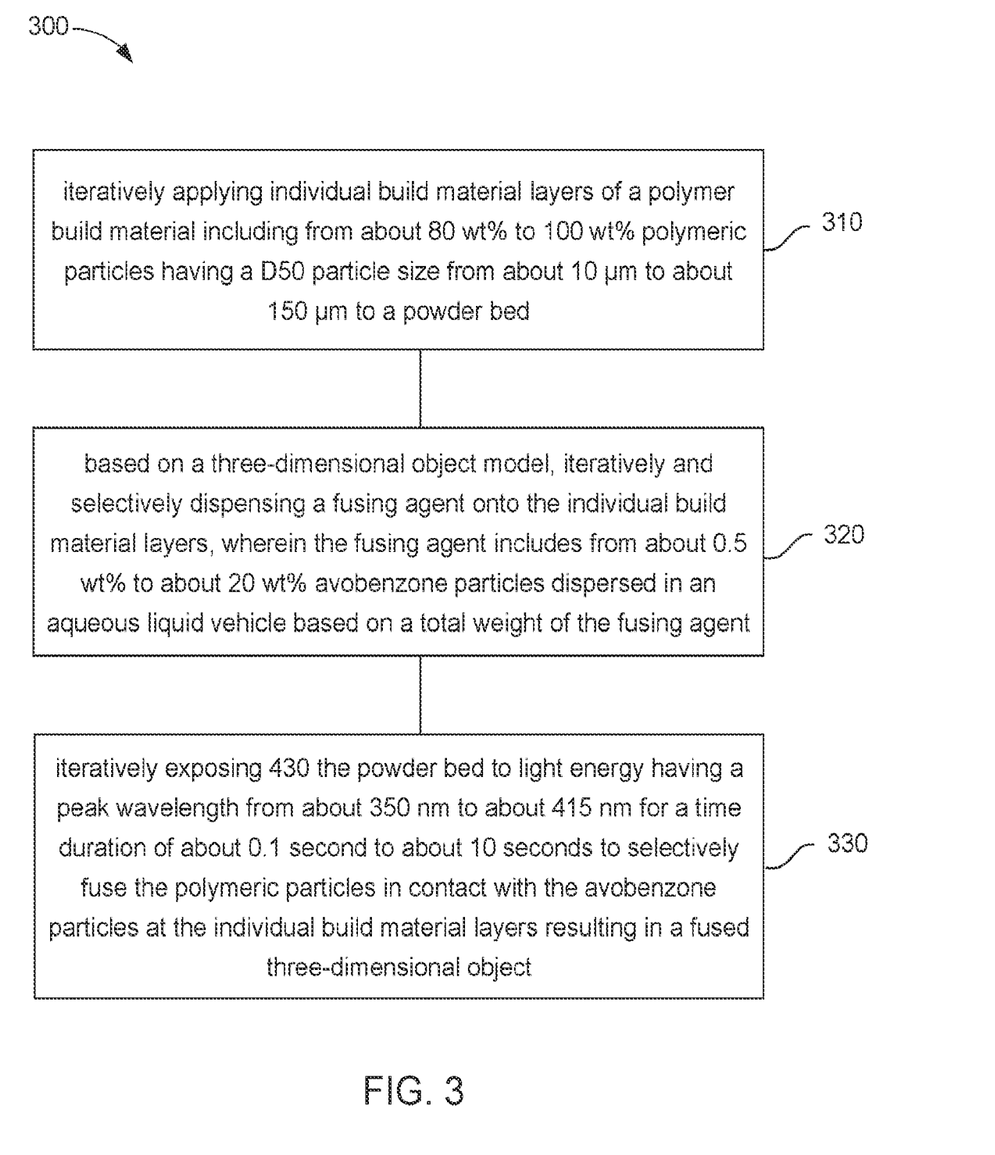
FIG. 3 illustrates an example method for three-dimensional printing in accordance with the present disclosure.

An example method for three-dimensional printing is illustrated schematically at 300 in FIG. 3. The method can include iteratively applying 310 individual build material layers of a polymer build material including from about 80 wt % to 100 wt % polymeric particles having a D50 particle size from about 10 µm to about 150 µm to a powder bed, and based on a three-dimensional object model, iteratively and selectively dispensing 320 a fusing agent onto the individual build material layers, wherein the fusing agent includes from about 0.5 wt % to about 20 wt % avobenzone particles dispersed in an aqueous liquid vehicle based on a total weight of the fusing agent. The method can also include iteratively exposing 330 the powder bed to light energy having a peak wavelength from about 350 nm to about 415 nm for a time duration of about 0.1 second to about 10 seconds to selectively fuse the polymeric particles in contact with the avobenzone particles at the individual build material layers resulting in a fused three-dimensional object. In further detail, the method can also include milling avobenzone in an aqueous carrier resulting in avobenzone particles having a D50 particle size from about 30 nm to about 1000 nm to form the fusing agent, or milling avobenzone in an aqueous carrier resulting in avobenzone particles having a D50 particle size from about 30 nm to about 1000 nm followed by admixing additional aqueous liquid vehicle with the aqueous carrier and avobenzone particles to form the fusing agent. The fused three-dimensional object formed can be white, for example.

Following jetting, an electromagnetic energy source can be used to expose the powder bed to the radiation energy and to selectively fuse portions of individual layers of the build material together to form the three-dimensional object. The electromagnetic radiation source can be a static lamp or can travel latterly by carriage along with the fluid ejectors. The electromagnetic energy source can be as described above.

In some examples, the method can further include milling avobenzone in an aqueous dispersing vehicle to form the avobenzone particles having a D50 particle size from about 30 nm to about 1000 nm. For example, the milling can include placing a milling machine, such as a shaker, with the liquid dispersing vehicle, e.g., water, organic cosolvent, dispersant, etc. An example formulation used to make the avobenzone particles can include from about 1 wt % to about 20 wt % avobenzone, from about 5 wt % to about 50 wt % propylene glycol (organic cosolvent), from about 0.1 wt % to about 8 wt % Disperbyk®-190 (dispersant), from about 0 wt % to about 2 wt % Tergitol®-15-s-9 (surfactant), from 0 wt % to about 10 wt % isopropyl alcohol (organic cosolvent), and a balance of water. These ingredients are provided by way of example, as other organic cosolvents, other dispersant, other surfactant, etc., can be used in forming the avobenzone particles. In further detail, the milling can occur for a period of time until the desired D50 particle size is obtained, e.g., from about 4 hours to about 96 hours, from about 8 hours to about 96 hours, from about 12 hours to about 72 hours, from about 18 hours to about 48 hours, etc.

In yet other examples, the method can further including holding the build material at an elevated temperature less than the melting temperature of the polymeric particles to remove volatile fusing agent components applied thereon during printing. Heat can be applied to the build material to bring the build material to a temperature near its fusing temperature, making it easier to bring up a temperature enough to generate fusion of the build material. For example, heat may be applied to the build material in the powder bed from the build platform, from above, or to the polymeric build material prior to being spread on the powder bed to preheat the polymeric build material within about 10° C. to about 70° C. of a fusing temperature of the polymeric particles so that less energy may be applied to bring the polymeric particles to their fusing temperature.

In yet other examples, the method can further include iteratively applying a second fluid agent to individual build material layers. The second fluid agent can be selected from a coloring agent that includes a liquid vehicle and a colorant (to impart color to the three-dimensional object), or a detailing agent that includes a detailing compound that reduces a temperature of the build material onto which the detailing agent is applied. Dispensing a detailing agent onto individual layers laterally at a border between a first area of the build material contacted by the fusing agent and an area of the build material uncontacted by the fusing agent. Printing a detailing agent laterally at a border can increase the definition of the three-dimensional object at the lateral edge and can permit a formation of a smooth edge at the printed three-dimensional object.

Figure 4:
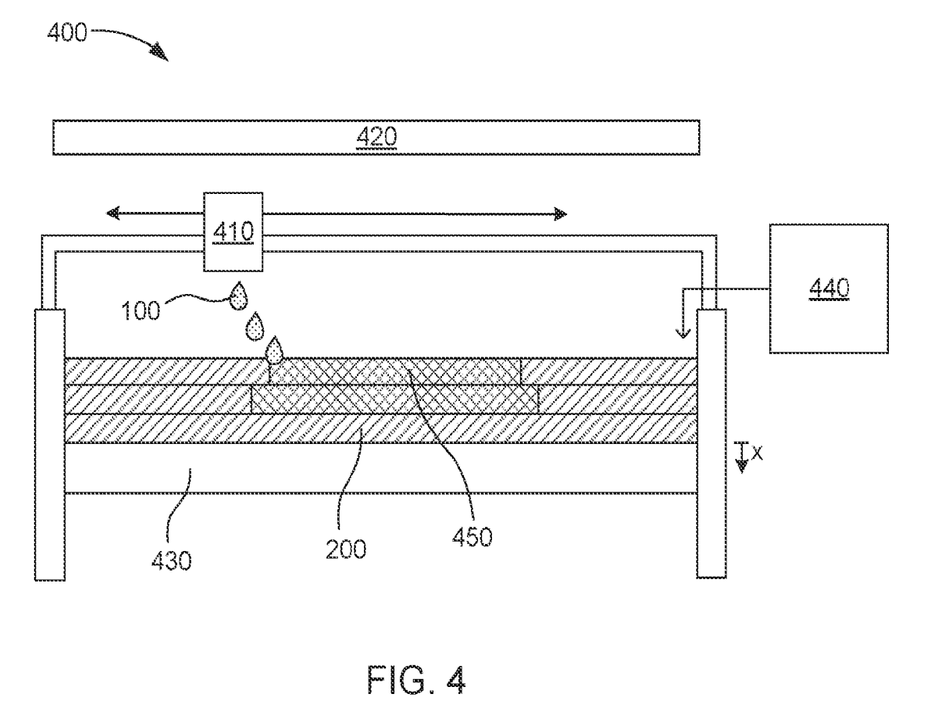
FIG. 4 schematically illustrates an example three-dimensional printing system usable in the method of FIG. 3 in accordance with the present disclosure.

Turning now to FIG. 4, a three-dimensional printing system 400 is shown by way of example to illustrate further the three-dimensional printing kits and method of three-dimensional printing described herein. For example, the three-dimensional printing system can include a build material 200, a fusing agent 100, a fluid applicator 410, and an electromagnetic energy source 420. The build material can include from about 80 wt % to 100 wt % polymeric particles having a D50 particle size from about 10 µm to about 150 µm. The fusing agent can include an aqueous liquid vehicle and avobenzone particles having an absorption peak from about 350 nm to about 415 nm. The fluid applicator can be fluidly coupled to or fluidly coupleable to the fluid agent to selectively and iteratively eject the fusing agent onto successive placed individual layers of the build material and the electromagnetic energy source can be positioned to expose the individual layers of the build material to radiation energy to selectively fuse the polymeric particles in contact with the avobenzone particles to iteratively form a three-dimensional object 450. The build material and fusing agent can be as described above with respect to the three-dimensional printing kit. The three-dimensional printing system can also further include a second fluid, such as a coloring agent and/or a detailing agent (not shown) as described previously.

The fluid applicator in further detail can be any type of apparatus capable of selectively dispensing or applying a fluid agent. For example, the fluid applicator can be a fluid ejector or digital fluid ejector, such as an inkjet print head, e.g., a piezoelectric print head, a thermal print head, a continuous print head, etc. The fluid applicator could likewise be a sprayer, a dropper, or other similar structure for applying a fluid agent to the polymeric build material. Thus, in some examples, the application can be by jetting or ejecting from a digital fluid jet applicator, similar to an inkjet pen.

In an example, the fluid applicator can be located on a carriage track, but could be supported by any of a number of structures. In yet another example, the fluid applicator can include a motor (not shown) and can be operable to move back and forth, and the fluid applicator can also be moved front to back as well, to provide both x-axis and y-axis movement over the polymeric build material when positioned over or adjacent to a polymeric build material on a powder bed of a build platform.

In some examples, as further illustrated in FIG. 4, the three-dimensional printing system can include, in addition to the fluid applicator and three-dimensional printing kit, a build platform 430 that can support a powder bed of build material. The build platform can be positioned to receive the fusing agent from the fluid applicator onto the build material. The build platform can be configured to drop in height (shown at "x"), thus allowing for successive layers of build material to be applied by a spreader 440. The build material can be layered in the build platform at a thickness that can range from about 5 µm to about 1 cm. In some examples, individual layers can have a relatively uniform thickness. In one example, a thickness of a layer of the particulate build material can range from about 10 µm to about 500 µm, from about 50 µm to about 500 µm, from about 80 µm to about 400 µm, from about 100 µm to about 350 µm, or from about 100 µm to about 300 µm.

The electromagnetic energy source can be any energy source operable to emit ultraviolet energy having a wavelength that can range from 345 nm to about 415 nm, and typically have a peak within this range, but could have a peak immediately adjacent to within this range with enough electromagnetic radiation from the peak to cause the avobenzone particles to generate sufficient heat to fuse the polymeric particles together to form the three-dimensional object. The electromagnetic energy source can be selected from a UV LED array, fluorescent lamp emitting UV, mercury vapor lamp, high energy gas discharge lamp, UV emitting laser or laser array. In one example, the electromagnetic energy source can be a UV LED array.

Three-Dimensional Printed Objects

Figure 5:
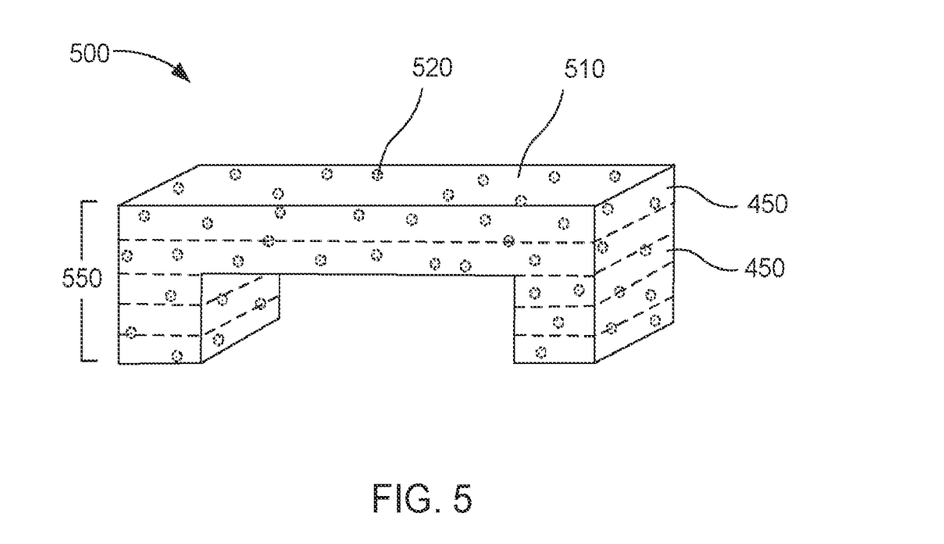
FIG. 5 schematically illustrates an example three-dimensional printed object in accordance with the present disclosure.

In another example, a three-dimensional printed object 500 is shown in FIG. 5, and can include multiple fused polymeric layers 450 that are also fused to one another. The individual fused polymeric layers include a fused composite 550 of polymeric particles 510 and avobenzone particles 520. In examples herein, the polymeric particles (or fused polymer) to avobenzone particle content weight ratio can be from about 1000:1 to about 9:1. In the three-dimensional printed object, a weight ratio of 1000:1 can be achieved with lower fusing agent depositions (lower contone application) and lower concentrations of avobenzone particles in the fusing agent. Conversely, the 9:1 weight ratio may represent a higher fusing agent deposition (higher contone application) with a higher concentration of avobenzone particles in the fusing agent. Other weight ratio ranges of (fused) polymeric particles to avobenzone particles found in the three-dimensional printed object can be from about 15:1 to about 800:1, from about 20:1 to about 500:1, from about 50:1 to about 350:1, or from about 100:1 to about 250:1, for example.

Definitions

It is noted that, as used in this specification and the appended claims, the singular forms "a," "an," and "the" include plural referents unless the context clearly dictates otherwise.

As used herein, "liquid vehicle" or "aqueous liquid vehicle" refers to water and in some examples, other components, such as, surfactants, solvents, cosolvents, antikogation agents, buffers, biocides, sequestering agents, viscosity modifiers, surface-active agents, and the like.

The term "dispersing vehicle" or "aqueous dispersing vehicle" refers to the fluid vehicle used to prepare the avobenzone particles for inclusion in a fusing agent. In some examples, if nothing is added to the dispersing vehicle, the dispersing vehicle may be the same as the liquid vehicle. In many examples, however, additional or more of the same component(s) may be added to the dispersing vehicle to form the liquid vehicle of fusing agent.

As used herein, "jetting" or "jettable" refers to compositions that are ejectable from jetting architecture, such as ink-jet architecture. Ink-jet architecture can include thermal or piezo pens with printing orifices or openings suitable for ejection of small droplets of fluid. In a few examples, the fluid droplet size can be less than 10 picoliters, less than 20 picoliters, less than 30 picoliters, less than 40 picoliters, less than 50 picoliters, etc. Jetting is one methodology of applying fusing agent or other fluid agents to a build material in accordance with the present disclosure.

As used herein, "kit" can be synonymous with and understood to include a plurality of compositions including one or more components where the different compositions can be separately contained in one or more containers prior to and during use, e.g., building a three-dimensional object, but these components can be combined together during a build process. The containers can be any type of a vessel, box, or receptacle made of any material.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though members of the list is individually identified as a separate and unique member, Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if numerical values and sub-ranges are explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Fusing Agents

Fusing agent formulations are prepared in accordance with the following formulations, as shown in Table 1 below:

TABLE 1

| Fusing Agents | | | |
|---|---|---|---|
| Ingredient | Component Type | Wt % Active | Wt % |
| Avobenzone | Fusing Compound | 100 | 1-20 |
| Propylene glycol | Organic Cosolvent | 100 | 5-50 |
| Isopropyl Alcohol | Organic Cosolvent | 100 | 0-6 |
| Disperbyk ® 190 | Dispersant | 40 | 0.1-8 |
| Tergitol ® 15-s-9 | Surfactant | 100 | 0-2 |
| DI Water | Solvent | 100 | Balance |

Disperbyk ® 190 is a high molecular weight block copolymer with pigment affinic groups, available from Byk (Altana Group) (China).
Tergitol ® 15-s-9 is a linear non-ionic surfactant that is a secondary ethoxylated alcohol, available from Dow (USA).

The fusing agents shown in Table 1 can be prepared by mixing avobenzone, propylene glycol, the Disperbyk®-190, and water, followed by milling for about 48 hours to disperse the avobenzone to achieve a D50 particle size from about 30 nm to about 1000 nm, e.g., 215 nm or 280 nm are two specific examples obtained. The fusing agent can then be formulated by adding additional components, such as surfactant, isopropyl alcohol, etc., and/or by adding more of the same the components, e.g., propylene glycol, water, etc.

In accordance with this example, Fusing Agent 1 is prepared using 2 wt % avobenzone particles having a D50 particle size of about 238 nm. Fusing Agent 2 is prepared having 5 wt % of avobenzone particles having a D50 particle size of about 215 nm. These fusing agents (Fusing Agent 1 and Fusing Agent 2) were initially tested for jettability by individually dispensing the formulations as bars printed onto a paper medium using an HP® ink jet printer. The fusing agent formulations did not exhibit any significant negative effects on decap or nozzle health of the print head.

Figure 6:
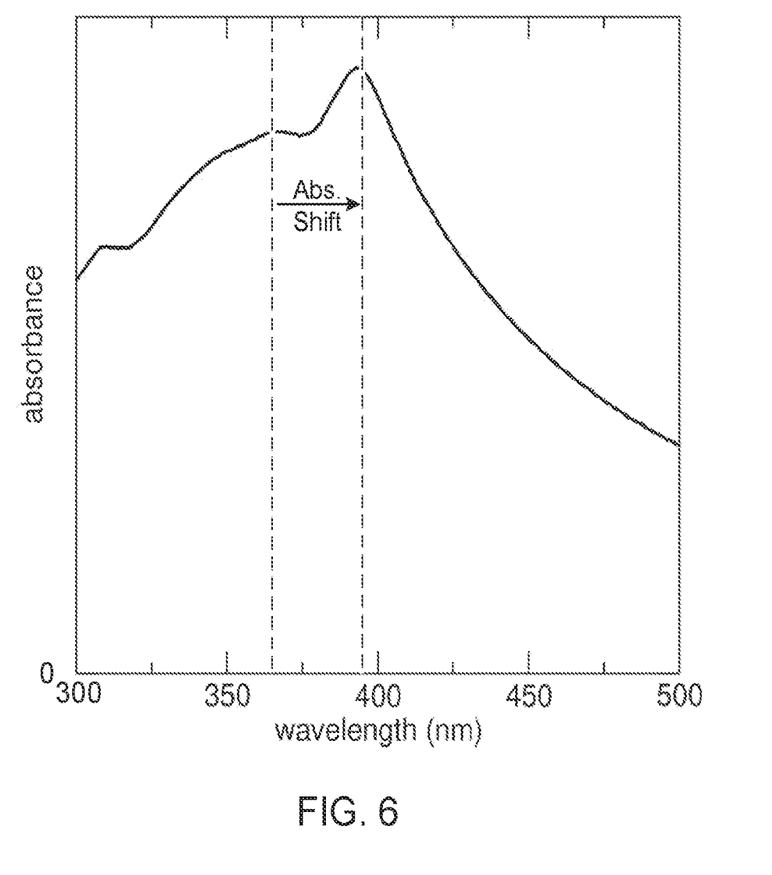
FIG. 6 illustrates an example of an absorbance spectra of an example fusing agent in accordance with the present disclosure.

The absorbance spectrum of Fusing Agent 2 was tested to evaluate the absorbance, and to determine where the absorbance peak would be located. Normally, avobenzone has an absorbance peak at about 357 nm. However, when evaluated in the formulation prepared in accordance with the present Example, the fusing agent has a bifurcated absorbance peaks at about 365 nm and 395 nm, as shown in FIG. 6, which works well for UV energy sources having a peak emission within the range of about 345 nm to about 415 nm, e.g., UV-LED 365 nm or UV-LED 395 nm.

Example 2—Preparation of Three-Dimensional Objects

In order to test the fusing capability of the fusing agent formulations from Table 1 above as well as whether the fusing agent would retain the white color of the build material, Fusing Agent 1 (2 wt % avobenzone particles; 238 nm) was used offline with polyamide-12 (PA-12) particles as the build material to form single layer objects having a thickness of about 500 μm. The fusing agent was applied at a 128 contone (2 drops per pixel), which corresponds to a fusing agent to polymeric build material weight ratio of about 20:1. The UV radiation was applied having a 395 nm UV peak set at 10 W/cm². At room temperature, two single layer objects were prepared at room temperature with a dwell time was set at 5 seconds and 1 second. At 140 C, four additional single layer objects were prepared at 1.5 second, 1 second, 0.5 second, and 0.2 second dwell times. The area where fusing agent was applied melted into a fused part while the surrounding powder did not melt. All of the parts prepared retained their white color.

Following this experiment, more complex multi-layered three-dimensional object were prepared using Fusing Agent 2 (215 nm particle size), Two different types of polymeric particles were used as the build material, namely polyamide-12 (PA-12) and thermoplastic polyamide (TPA). The build material was heated to 160° C. for PA-12 and to 120° C. for TPA. Thus, the build materials were brought to an elevated temperature within about 30° C. of the fusing temperature prior to application of the UV radiation. Fusing Agent 2 was then selectively applied to portions of the build material that corresponded with a layer of the three-dimensional object shape at 256 contone (4 drops/pixel), which corresponds to a fusing agent to polymeric build material weight ratio of about 0.47. This was repeated in a layer-by-layer manner until three-dimensional objects shaped like dog bones (and even more complex shapes) were formed having about 2.4 wt % avobenzone content throughout the object.

It is understood that this process can be repeated with more or even less avobenzone content being present in the final three-dimensional printed object.

While the present technology has been described with reference to certain examples, it is appreciated that various modifications, changes, omissions, and substitutions can be made without departing from the spirit of the disclosure. It is intended, therefore, that the disclosure be limited only by the scope of the following claims.

What is claimed is:

1. A three-dimensional printing kit, comprising:
   a build material including from about 80 wt % to 100 wt % of polymeric particles having a D50 particle size ranging from about 10 μm to about 150 μm; and
   a fusing agent including from about 0.5 wt % to about 20 wt % of avobenzone particles dispersed in an aqueous liquid vehicle based on a total weight of the fusing agent.

2. The three-dimensional printing kit of claim 1, wherein the avobenzone particles have a D50 particle size of from about 30 nm to about 1000 nm.

3. The three-dimensional printing kit of claim 1, wherein the fusing agent has a peak absorption from about 345 nm to about 415 nm.

4. The three-dimensional printing kit of claim 3, wherein the fusing agent has an absorbance from about 0.2 to about 0.8 at the peak absorption.

5. The three-dimensional printing kit of claim 1, wherein the fusing agent includes:
   from about 10 wt % to about 85 wt % of water;
   from about 5 wt % to about 60 wt % of an organic cosolvent;
   from about 0.01 wt % to about 5 wt % of a surfactant; and
   from about 0.05 wt % to about 20 wt % of a dispersant.

6. The three-dimensional printing kit of claim 1, wherein the polymeric particles are white.

7. The three-dimensional printing kit of claim 6, wherein after application of the fusing agent to a layer of polymeric particles followed by heat fusion using light energy applied at a peak wavelength from about 350 nm to about 415 nm, an energy level from about 5 W/cm² to about 30 W/cm², and an irradiation application time from of about 0.1 second to about 10 seconds to form a fused polymeric layer, and wherein the fused polymeric layer remains white.

8. The three-dimensional printing kit of claim 1, wherein the polymeric particles include polyacetals, polyacrylates, polybutylene terephthalates, polycarbonates, polyesters, polyether ketones, polyethylene terephthalates, polyethylenes, polypropylenes, polystyrenes, polyurethanes, thermoplastic polyurethanes, polyamides, thermoplastic polyamides, a copolymer thereof, or a mixture thereof.

9. The three-dimensional printing kit of claim 1, further comprising a second fluid agent selected from i) a coloring agent that includes a liquid vehicle and a colorant, or ii) a detailing agent that includes a detailing compound that reduces a temperature of the build material onto which the detailing agent is applied.

10. A method for three-dimensional printing, the method comprising:
   iteratively applying individual build material layers of a polymer build material including from about 80 wt % to 100 wt % of polymeric particles having a D50 particle size of from about 10 μm to about 150 μm to a powder bed;
   based on a three-dimensional object model, iteratively and selectively dispensing a fusing agent onto the individual build material layers, wherein the fusing agent includes from about 0.5 wt % to about 20 wt % of avobenzone particles dispersed in an aqueous liquid vehicle based on a total weight of the fusing agent; and
   iteratively exposing the powder bed to light energy having a peak wavelength of from about 350 nm to about 415 nm for a time duration of from about 0.1 second to about 10 seconds to selectively fuse the polymeric particles in contact with the avobenzone particles at the individual build material layers resulting in a fused three-dimensional object.

11. The method of claim 10, further comprising:
   milling avobenzone in an aqueous carrier resulting in the avobenzone particles having a D50 particle size of from about 30 nm to about 1000 nm to form the fusing agent; or
   milling avobenzone in an aqueous carrier resulting in the avobenzone particles having a D50 particle size of from about 30 nm to about 1000 nm followed by admixing additional aqueous liquid vehicle with the aqueous carrier and the avobenzone particles to form the fusing agent.

12. The method of claim 10, wherein the fused three-dimensional object is white.

13. The method of claim 10, wherein based on the three-dimensional object model, the method further comprises iteratively applying a second fluid agent to the individual build material layers, wherein the second fluid agent is selected from i) a coloring agent that includes a liquid vehicle and a colorant, or ii) a detailing agent that includes a detailing compound that reduces a temperature of the build material onto which the detailing agent is applied.

* * * * *